United States Patent [19]

Kruse et al.

[11] 4,228,819

[45] Oct. 21, 1980

[54] AXIAL FLOW THROTTLING VALVE

[75] Inventors: John M. Kruse; Leland E. Gelnett, both of DuBois, Pa.

[73] Assignee: Rockwell International Corporation, Pittsburgh, Pa.

[21] Appl. No.: 925,069

[22] Filed: Jul. 17, 1978

Related U.S. Application Data

[63] Continuation of Ser. No. 697,492, Jun. 18, 1976, abandoned.

[51] Int. Cl.³ ............................................. G05D 16/16
[52] U.S. Cl. ..................................... 137/489; 137/492
[58] Field of Search ...................... 137/489, 492, 492.5, 137/488

[56] References Cited

U.S. PATENT DOCUMENTS

| | | | |
|---|---|---|---|
| 2,747,606 | 5/1956 | Adams | 137/489 |
| 3,138,174 | 6/1964 | Gilpin | 137/503 X |
| 3,669,142 | 6/1972 | Gerbic | 137/489 |
| 4,026,513 | 5/1977 | Callenberg | 137/489 X |

*Primary Examiner*—Alan Cohan

[57] ABSTRACT

This application discloses a tube-type throttling valve assembly and the particular construction of the valve, along with the control passages and associated pilot controls.

3 Claims, 3 Drawing Figures

4,228,819

AXIAL FLOW THROTTLING VALVE

This is a continuation of application Ser. No. 697,492, filed June 18, 1976 now abandoned.

BACKGROUND OF THE INVENTION

This invention relates to a flexible tube-type throttling valve assembly particularly useful in gas pressure control.

In a preferred configuration, an expansible tube is carried on a core sleeve which is shaped for easy and economical construction and assembly. The sleeve has axially spaced inlet and outlet openings with an intermediate barrier preventing axial flow through the sleeve. This sub-assembly is inserted into the body of the valve and seated on bosses provided in the valve and the cover member. A chamber for control fluid is provided in the body around the flexible tube, and fluid passageway means is provided from upstream of the valve to transmit the upstream fluid to the chamber. In this passageway is an automatically varying flow restrictor for controlling the rate of admission of fluid to the chamber. In addition, a passageway to the downstream side of the valve, controlled by pilot means, regulates the rate of outflow of fluid from the chamber.

OBJECTS OF THE INVENTION

It is an object of this invention to provide a flexible tube-type valve which maintains a more uniform pressure level over a wider range of flow rates than previous devices.

It is a further object of this invention to provide a variable restrictor in the upstream line to the control chamber to enhance the effect of the pilot means for regulating the outflow of fluid from the chamber.

It is a further important object of this invention to provide a compact unitary control assembly which is easy to assemble and maintain, and which is useful in a variety of services, by merely using the pilot for the desired range.

BRIEF SUMMARY OF THE INVENTION

In accordance with this invention, the assembly comprises a flexible, expansible tube stretched over a core sleeve having upstream and downstream flow openings and an intermediate barrier blocking axial flow. A series of openings around the core are arranged to be selectively covered and uncovered by the flexible tube in response to differential pressures on the tube. For this purpose a chamber around the tube is connected to the upstream and downstream flow passages. In the downstream passage is a pilot valve for controlling withdrawal of fluid from the chamber, while in the upstream passage is mounted an automatically varying restrictor for simultaneously automatically controlling entry of pressure fluid to the chamber. All the control fluid passages, the pilot valve, and the automatic restrictor are installed in the valve housing, making an efficient and compact installation. Provision is made for mounting a variety of pilot control elements, to allow a wide range of services from this configuration.

DESCRIPTION OF THE PREFERRED EMBODIMENT

Figure 1:
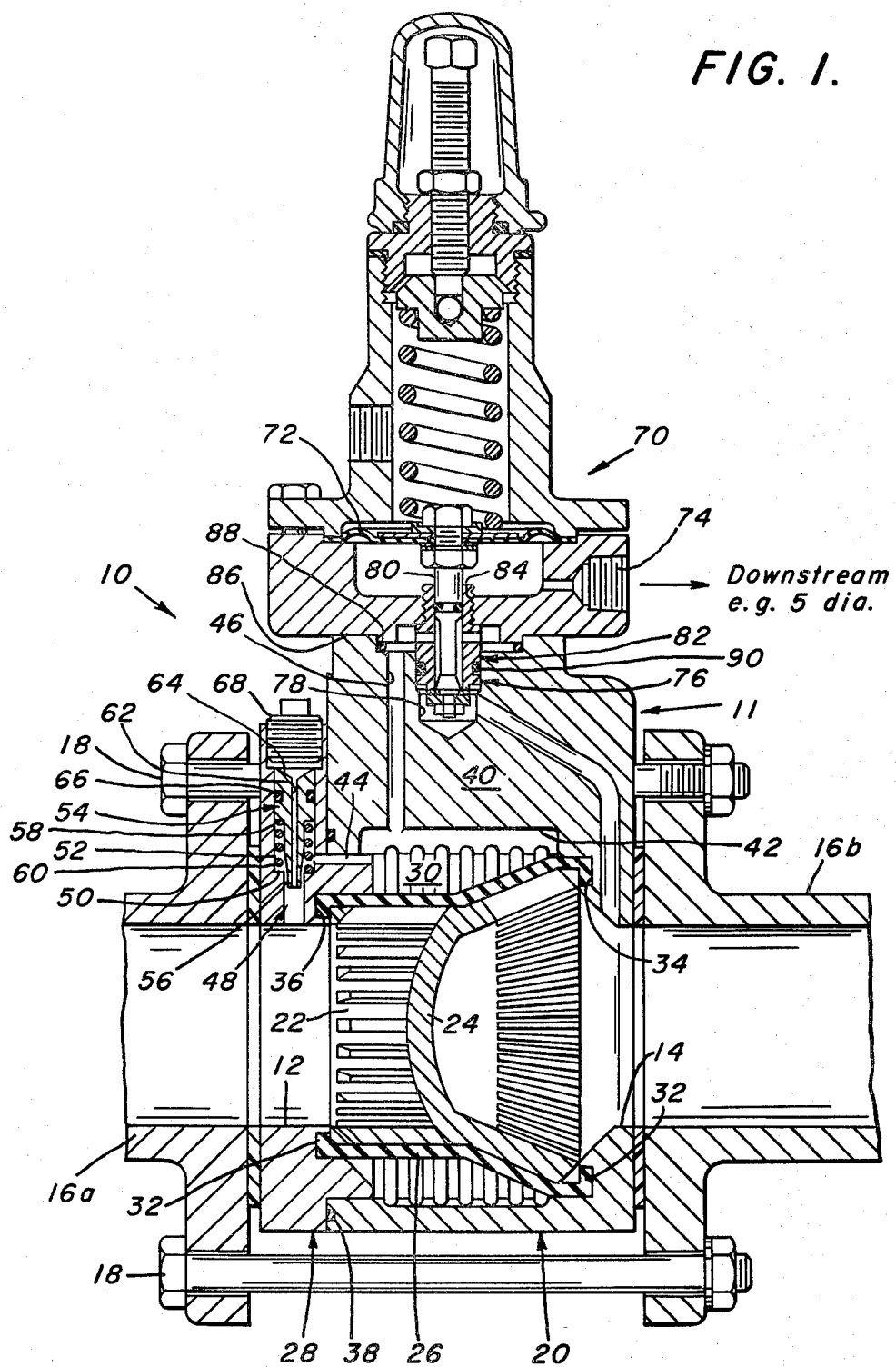
FIG. 1 is a longitudinal sectional view of one embodiment of an expansible tube throttling valve assembly.

The assembly as shown in FIG. 1 includes a valve 10 having a housing 11 and a control element 70. Housing 11 includes a body 20 and a cover member 28 over one end of the body. Inside body 20, in the flow passage, is a slotted cage 22 with a barrier 24, and a resilient expansible sleeve 26 held in place by a cover member 28. The assembly has an inlet passage 12 and outlet passage 14. This assembly is adapted to be mounted in a fluid-line 16a-16b and to be held in place by the flanges of the pipeline. These flanges are drawn together to hold the valve between them by bolts one of which is shown at 18.

As depicted in FIG. 1, the expansible sleeve 26 is shaped with inturned flange members 32 on either end. Sleeve 26 is pulled over cage 22, then inserted into body 20 until the flange and corresponding end of cage 22 abut shoulder 34 on outlet 14. Cover member 28, with inlet passage 12, is made to interfit with body 20, and has a shoulder 36 adapted to engage the other end of cage 22 and the other inturned flange 32 of the sleeve 26. Suitable seal means 38 is located between cover 28 and body 20.

Figure 2:
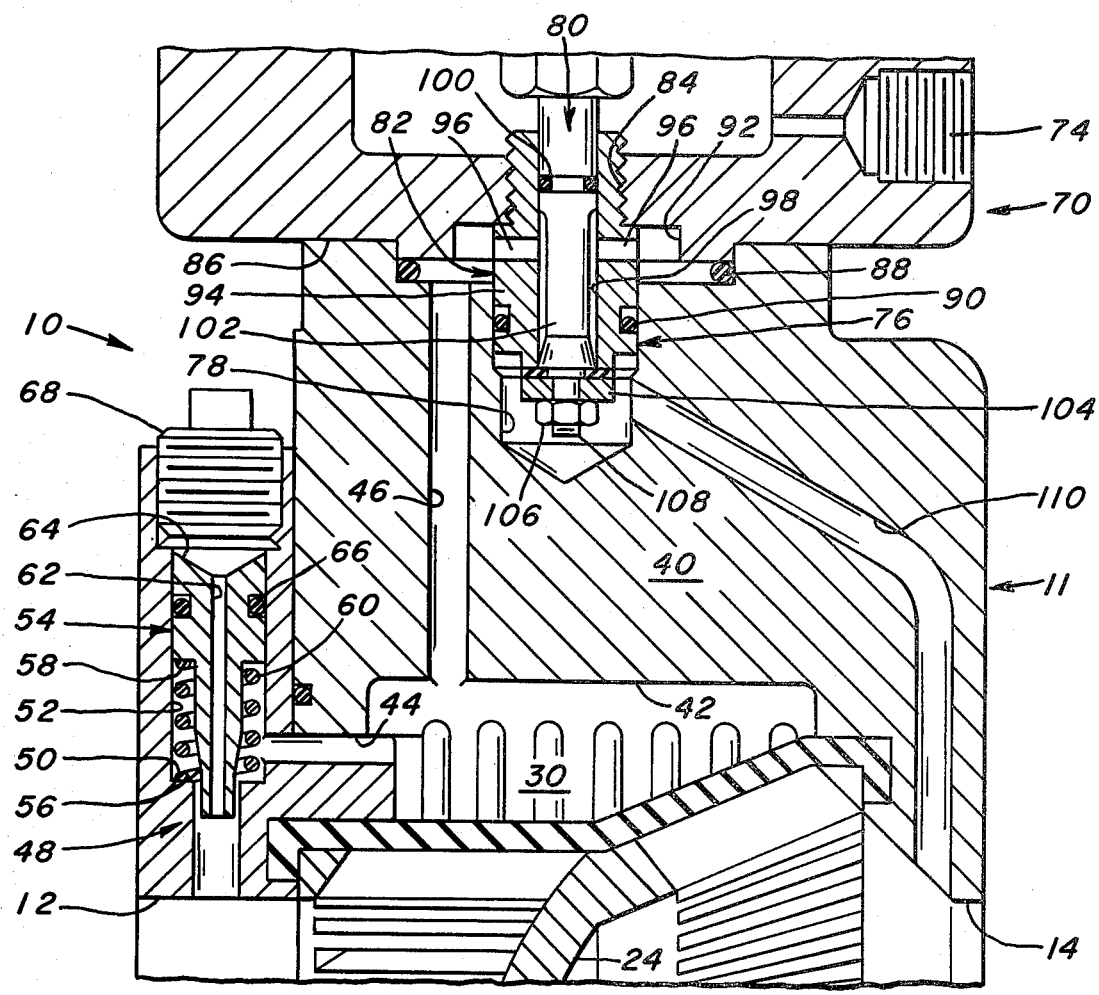
FIG. 2 is a similar sectional view of the control passages and the automatic restrictor on a larger scale.

A chamber 30 surrounds sleeve 26. Referring to FIGS. 1 and 2, it can be seen that the top 40 of valve body 20 is enlarged to accommodate porting and manifold 42, which is open to chamber 30. The ports 44 and 46 connect manifold 42 to the upstream pressure and the downstream side of valve 10, respectively.

With reference to FIG. 2, we see the inlet line consists of bore 48 in cover 28, connected to port 44. The bore 48 has a step or shoulder 50 and an enlarged portion 52 in which is mounted a floating plug 54. Plug 54 has a tapered nose portion 56 which cooperates with shoulder 50 to govern the inflow of fluid to port 44. Plug 54 also has a shoulder 58 against which a spring 60 bears. The other end of spring 60 is seated on shoulder 50 to bias plug 54 towards the open position. A longitudinal bore 62 through plug 54 allows the upstream pressure to act against the end 64 of the plug. O-ring 66 seals the bore 52, and threaded cap 68 closes the end of the bore and provides a limit stop for plug 54.

From the foregoing, it will be seen that the upstream pressure is transmitted through bore 48 and port 44 to manifold 42 (and chamber 30), subject to restriction by floating plug 54.

Referring to FIGS. 1 and 2, on the outlet side of manifold 42, port 46 connects to a pilot regulator 70. In the illustrated embodiment, regulator 70 has a spring-biased diaphragm 72, which is acted upon by downstream pressure through port 74. Variations in this downstream pressure, which is conducted to port 74 by piping which is not shown, modify the position of the diaphragm, which is connected to a pilot valve 76 seated in a recess 78 in the top 40 of the valve body 20 by a valve stem 80, in a well-known construction for pilot regulators. The construction of the pilot regulator, except as herein described is too well-known to require further amplification. Depending on the range of service desired, any of a number of pilot regulators can be used in the manner described herein.

The seat assembly 82 of valve 76 is threaded into the small portion of a stepped bore 84 in the bottom of regulator 70. The bottom face 86 of the regulator seats upon the top 40 of valve body 20, and is sealed, as by O-ring seal 88.

In this embodiment, seat assembly 82 projects from the bottom of regulator 70 into recess 78 in the top of main valve body 20.

Another seal 90 seals the interface between recess 78 and seat assembly 82 in the top 40 of the main valve body.

Referring now to FIG. 2, counterbore 92 of stepped bore 84 is connected to manifold 42 by outlet port 46. Around seat assembly stem 94 radial holes 96 connect this counterbore area 92 with axial passage 98 in the seat stem 94. Valve stem 80, connected with diaphragm 72, projects through passage 98, with an O-ring seal 100 sealing the upper portion of the stem 80 in passage 98. Stem 80 has a reduced diameter portion 102, providing considerable clearance for flow of fluid in passage 98. On the bottom is sealing member 104 of stem 80 to engage the bottom of seat stem 94, to block flow of fluid from passage 98 when the pilot regulator 70 is in one limit position. This sealing member is retained on stem 80 by a nut 106 threaded on threaded portion 108 of stem 80.

The recess 78 in the body is sufficiently deep to allow movement of stem 80 in response to movement of diaphragm 72. In the wall of recess 78 below valve 76 is an outlet port 110 which connects the recess with outlet passage 14 downstream of cage 22. From the foregoing, it will be seen that the pressure in manifold 42 and chamber 30 is controlled in part by the pilot 70, which is itself governed by the pressure downstream of the valve 10. Modifying the manifold pressure is the floating plug, or variable restrictor 54.

It is obvious that any of a number of pilot controls is useful with this assembly, and the manifold ports can be adjusted to suit the requirements of the different pilots. For example, the outlet port 46 from manifold 42 could enter recess 78 at the bottom, and outlet port 110 to the downstream passage 14 could connect with counterbore 92.

Figure 3:
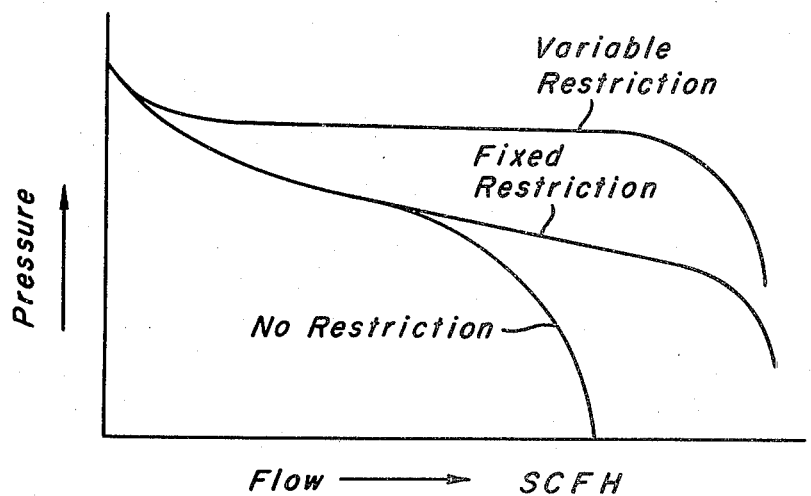
FIG. 3 is a graph of pressure vs. flow showing the improved performance attained by the automatic restrictor.

Turning now to FIG. 3, we see a comparison of the performances of a given throttling valve assembly. The differences in performance were caused by changes in the inlet flow to the manifold. In the one case, an open line connecting the inlet 12 of the valve with manifold 42 was used. Placing a fixed restrictor in the line, as is commonly done at present, increased the range of flow rates over which the assembly was operable, but the pressure drop for each increment in flow rates was still large. With the variable restrictor in the inlet line to control inlet flow to the manifold, the pressure remained nearly constant over essentially the entire range of flow rates. Thus, it can be seen that fluctuating demand rates downstream, varying the rate of flow through this assembly, has a minimal effect on downstream line pressure, providing improved performance in operation.

In operation, as demand changes downstream, the pilot regulator 70 changes the setting of valve 76, changing the pressure in manifold 42 and control chamber 30. Flow into chamber 30 is modified by variable restrictor 54, and provides the operating characteristics shown on FIG. 3 as the curve labeled "with variable restrictor" As an example, if flow through valve 10 is low or minimal, the variable restrictor is open its widest, under the influence of spring 60 and the differential pressure. If added load downstream decreases the downstream pressure, the diaphragm of pilot regulator 70 moves downwardly, as seen in FIGS. 1 and 2, opening pilot valve 76. This produces a drop in pressure in manifold 42, and a corresponding pressure drop on shoulder 58 of plug 54. Upstream pressure, applied through bore 62 to the top 64, moves floating plug 54 downwardly into bore 48 restricting the flow around the plug into the inlet port 44 and manifold 42. This allows resilient sleeves 26 to open further, due to the increased pressure differential between inlet 12 and control chamber 30. On the opening of boot 26, increased flow takes place, which restores the pressure downstream, which in turn moves pilot regulator 70 to a more restrictive opening of its valve 76. This in turn restricts the flow through port 46 which, in its turn, increases the pressure in manifold 42 and control chamber 30. The increased pressure in the manifold is also transmitted to shoulder 58 of floating plug 54, floating plug 54 adjusts to the pressure increase influenced by shoulder 58 and spring 60.

As can be seen from the above description of the operation of the floating plug in the automatic restrictor, it acts to modify the operation of the system. Obviously, if the load downstream decreases, the reverse operation of the system takes place. The modifying effect is shown in FIG. 3, giving a very small change in pressure for relatively large changes in flow rates as compared to previous methods of modification of the inlet line.

We claim:

1. A self-contained valve assembly for controlling the flow of gaseous fluid in a pipeline to maintain uniform downstream pressure with varying downstream load, comprising a housing having a main fluid passage therethrough, cage means and a resilient boot member in said main passage for controlling the flow of fluid therethrough, a chamber formed in the housing around at least a portion of said boot means, upstream passage means wholly contained in said housing connecting said chamber with said main passage at a point upstream of said cage, a variable restriction in said upstream passage means to control the rate of entry of upstream control fluid into said chamber, downstream passage means wholly contained in said housing connecting said chamber with said fluid passage at a point downstream of said cage, diaphragm controlled pilot valve means mounted on said housing having a control valve projecting into said downstream passage means to control the flow of control fluid out of said chamber through said downstream passage means, and means on said pilot valve means to facilitate a fluid connection between the diaphragm of said valve means and said pipeline downstream of said valve.

2. The invention defined in claim 1 in which said restriction comprises a seat in said upstream passage means, a pressure controlled plug in said passage means adapted to cooperate with said seat to provide a variable restriction in said passageway, biasing means to bias said plug away from said seat, and means to apply upstream control pressure to said plug in opposition to the force of said biasing means.

3. The invention defined in claim 2 in which said last mentioned means is a passage in said plug through which the upstream control pressure is applied to the end of said plug which is remote from said seat.

* * * * *